(12) United States Patent
Gu et al.

(10) Patent No.: US 11,994,893 B2
(45) Date of Patent: May 28, 2024

(54) CONVERTER CONTROL METHOD, CONVERTER, AND PHOTOVOLTAIC POWER GENERATION SYSTEM

(71) Applicant: Huawei Digital Power Technologies Co., Ltd., Shenzhen (CN)

(72) Inventors: Guilei Gu, Shanghai (CN); Zhiwu Xu, Shanghai (CN); Yu Wang, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 167 days.

(21) Appl. No.: 17/696,596

(22) Filed: Mar. 16, 2022

(65) Prior Publication Data
US 2022/0206522 A1    Jun. 30, 2022

Related U.S. Application Data

(63) Continuation of application No. PCT/CN2020/096888, filed on Jun. 18, 2020.

(51) Int. Cl.
*G05F 1/67* (2006.01)
*H02S 40/32* (2014.01)

(52) U.S. Cl.
CPC ............ *G05F 1/67* (2013.01); *H02S 40/32* (2014.12)

(58) Field of Classification Search
CPC ........................................................ G05F 1/67
USPC ............................................................ 307/82
See application file for complete search history.

(56) References Cited

U.S. PATENT DOCUMENTS

| | | |
|---|---|---|
| 2011/0127841 A1 | 6/2011 | Chiang et al. |
| 2013/0197834 A1* | 8/2013 | Maki ............... G01R 21/02 702/60 |
| 2014/0211530 A1 | 7/2014 | Chen et al. |
| 2014/0375132 A1 | 12/2014 | Agarwal et al. |
| 2015/0370278 A1 | 12/2015 | Li et al. |

(Continued)

FOREIGN PATENT DOCUMENTS

| | | |
|---|---|---|
| CN | 103490650 A | 1/2014 |
| CN | 104022734 A | 9/2014 |
| CN | 106059484 A | 10/2016 |

(Continued)

OTHER PUBLICATIONS

Wang et al., "Application of Unified Output MPPT Control in DMPPT PV Systems," Proceedings of the CSEE, vol. 33 No. 21, Total 10 pages (Jul. 25, 2013). With an English abstract.

*Primary Examiner* — Joseph Chang
(74) *Attorney, Agent, or Firm* — Leydig, Voit & Mayer, Ltd.

(57) ABSTRACT

This application relates to a converter in a photovoltaic power generation system and a converter control method. An input end of the converter is connected to at least one photovoltaic module, and an output end is connected to an inverter. The control method includes: determining an output power-voltage (PV) curve of a converter based on an output PV curve of the photovoltaic module; and controlling a voltage output of the converter based on the output PV curve of the converter. The output PV curve includes at least a simulated voltage limiting section and a constant power section that are connected. In this application, an existing MPPT control policy of the inverter can be adapted when a voltage-limited output is implemented, to avoid a case in which a power of a photovoltaic string drops to zero.

21 Claims, 10 Drawing Sheets

(56) References Cited

U.S. PATENT DOCUMENTS

2017/0018931 A1    1/2017  Kahn et al.
2019/0074768 A1    3/2019  Yu et al.

FOREIGN PATENT DOCUMENTS

| CN | 106941263 | A | 7/2017 |
| --- | --- | --- | --- |
| CN | 107508463 | A | 12/2017 |
| CN | 109460107 | A | 3/2019 |
| CN | 111162734 | A | 5/2020 |
| JP | 2014128164 | A | 7/2014 |
| JP | 2015532983 | A | 11/2015 |
| WO | 2009051853 | A1 | 4/2009 |
| WO | 2017011547 | A1 | 1/2017 |

\* cited by examiner

Determine an output PV curve of a converter based on an output power-voltage (PV) curve of a photovoltaic module, where the output PV curve includes at least a simulated voltage limiting section and a constant power section that are connected, the simulated voltage limiting section means that an output voltage that is of the converter and that corresponds to any point in the section is proportional to an output voltage of the photovoltaic module and there is a same proportional coefficient, and the constant power section means that any two points in the section correspond to different output voltages and a difference between output powers corresponding to any two points in the section is less than a first preset threshold ⸺ S11

Control a voltage output of the converter based on the output PV curve ⸺ S12

FIG. 3

CONVERTER CONTROL METHOD, CONVERTER, AND PHOTOVOLTAIC POWER GENERATION SYSTEM

CROSS-REFERENCE TO RELATED APPLICATIONS

This application is a continuation of International Application No. PCT/CN2020/096888, filed on Jun. 18, 2020, the disclosure of which is hereby incorporated by reference in its entirety.

TECHNICAL FIELD

This application relates to the field of photovoltaic power generation technologies, and in particular, to a converter control method, a converter, and a photovoltaic power generation system.

BACKGROUND

Currently, to resolve series mismatch and parallel mismatch problems of a photovoltaic module, each photovoltaic module is usually connected to a converter (also referred to as an optimizer) with an independent MPPT (maximum power point tracking) function. An output of the converter is connected to an inverter through a specific series/parallel combination. In a photovoltaic system in which a distributed MPPT technology is used, the converter may convert an input voltage/current of the photovoltaic module into different output voltages/currents, to implement a photovoltaic module-level MPPT function, and improve an energy yield of the system to a maximum extent.

After the converter is configured in the photovoltaic power generation system, because the converter may perform a voltage-limited output, there is higher flexibility in configuring the photovoltaic module. An upper limit of a quantity of photovoltaic modules connected in series in a single photovoltaic string may be increased, so that the photovoltaic power generation system can have a higher capacity ratio. To implement the voltage-limited output to avoid a case in which a voltage of the photovoltaic string is too high, and consequently, the inverter performs overvoltage protection or even a failure occurs, a fixed voltage limiting method is used in an existing converter control method. To be specific, a fixed voltage limiting point is set for the converter, and the converter controls an output voltage to be less than or equal to the fixed voltage limiting point.

To match the fixed voltage limiting method of the converter, an input voltage control policy of the inverter needs to be adjusted and changed from an MPPT mode to a fixed input voltage control mode. However, when a plurality of photovoltaic modules in the photovoltaic string are seriously blocked, an input voltage operating point of the inverter is greater than a voltage limiting point of the photovoltaic string, an input current of the inverter is reduced to zero under action of an input voltage loop of the inverter, and a power of the photovoltaic string drops to zero, thereby seriously affecting the energy yield.

SUMMARY

Embodiments of this application disclose a converter control method, a converter, and a photovoltaic power generation system, so that an existing MPPT control policy of an inverter can be adapted when a voltage-limited output is implemented, to avoid a case in which a power of a photovoltaic string drops to zero, thereby ensuring stability of the photovoltaic power generation system, and increasing an energy yield of the system.

According to a first aspect, an embodiment of this application discloses a converter control method, used to control an output of a converter. An input end of the converter is connected to at least one photovoltaic module, an output end of the converter is connected to an inverter, and the converter is configured to: convert and output energy generated by the at least one photovoltaic module. The control method includes:

determining an output PV curve of the converter based on an output power-voltage (PV) curve of the photovoltaic module, where the output PV curve includes at least a simulated voltage limiting section and a constant power section that are connected, the simulated voltage limiting section means that an output voltage that is of the converter and that corresponds to any point in the section is proportional to an output voltage of the photovoltaic module and there is a same proportional coefficient, and the constant power section means that any two points in the section correspond to different output voltages and a difference between output powers corresponding to any two points in the section is less than a first preset threshold; and controlling a voltage output of the converter based on the output PV curve.

Based on the technical solution in the first aspect, because the output PV curve of the converter includes the simulated voltage limiting section, the output PV curve of the converter is partially similar to the output PV curve of the photovoltaic module. In other words, an output characteristic of the photovoltaic module is simulated, to limit a voltage, so that the photovoltaic module connected to the converter may be equivalent to a photovoltaic module. In other words, from a perspective of a downstream inverter, the photovoltaic module configured with the converter may be considered as a new photovoltaic module. Therefore, an existing MPPT control policy of the inverter can be adapted when a voltage-limited output is implemented, stability of a photovoltaic power generation system can be ensured, and an energy yield of the system can be improved.

According to the first aspect, in a possible implementation, a power corresponding to a first endpoint of the simulated voltage limiting section corresponds to a maximum output power of the photovoltaic module, a voltage corresponding to the first endpoint is determined based on a voltage corresponding to a maximum power point of the photovoltaic module and the proportional coefficient, and the constant power section is connected to the first endpoint. In this way, when an MPPT policy is used for the inverter, the maximum power point can be quickly found, and a case in which a power of a photovoltaic string drops to zero can be avoided.

According to the first aspect, in a possible implementation, a voltage corresponding to a second endpoint of the simulated voltage limiting section is a maximum output voltage of the converter, a power corresponding to the second endpoint is 0, and the maximum output voltage is determined based on an open-circuit voltage of the photovoltaic module and the proportional coefficient, or the maximum output voltage is determined based on a maximum input voltage of the inverter and a quantity of photovoltaic modules connected in series in each photovoltaic string. In this way, the simulated voltage limiting section is similar to a part between the maximum power point in the output PV curve of the photovoltaic module and the open-circuit voltage of the photovoltaic module, so that an output of the photovoltaic module connected to the converter is more similar to an output of the photovoltaic module.

According to the first aspect, in a possible implementation, to diversify the output PV curve of the converter when the MPPT control policy of the inverter is adapted, so as to improve adaptability of the converter, the output PV curve further includes a fixed voltage limiting section connected to the simulated voltage limiting section, the fixed voltage limiting section means that an output voltage corresponding to any point in the section is fixed and unchanged, and the first endpoint is far away from the fixed voltage limiting section.

According to the first aspect, in a possible implementation, a voltage corresponding to the fixed voltage limiting section is the maximum output voltage of the converter, to implement a voltage-limited output, and avoid a case in which a voltage of the photovoltaic string is too high, and consequently, the inverter performs overvoltage protection or even a failure occurs. The maximum output voltage is determined based on the open-circuit voltage of the photovoltaic module and the proportional coefficient, or the maximum output voltage is determined based on the maximum input voltage of the inverter and a quantity of photovoltaic modules connected in series in each photovoltaic string.

According to the first aspect, in a possible implementation, a second endpoint of the simulated voltage limiting section is a first endpoint of the fixed voltage limiting section, the voltage corresponding to the first endpoint of the simulated voltage limiting section is determined based on the voltage corresponding to the maximum power point of the photovoltaic module and an expansion coefficient, and the expansion coefficient is greater than the proportional coefficient. In this way, there may be an intersection point between the simulated voltage limiting section and the fixed voltage limiting section, and when the converter is a buck converter, the output voltage increases in a constant power period. Therefore, conversion efficiency can be improved.

According to the first aspect, in a possible implementation, the voltage corresponding to the first endpoint of the simulated voltage limiting section is less than a voltage corresponding to the fixed voltage limiting section, and a difference between the voltage corresponding to the first endpoint of the simulated voltage limiting section and the voltage corresponding to the fixed voltage limiting section is greater than a preset voltage, to avoid a case in which the simulated voltage limiting section is too short, and consequently, the power of the photovoltaic string drops to zero.

According to the first aspect, in a possible implementation, when the converter is only a boost converter, one endpoint of the constant power section corresponds to the maximum power point of the photovoltaic module.

According to the first aspect, in a possible implementation, the output PV curve of the converter further includes a straight-through section connected to the constant power section, and the straight-through section coincides with a curve between the maximum power point of the output PV curve of the photovoltaic module and a short-circuit current point, so that the photovoltaic module connected to the converter can be completely equivalent to the output of the photovoltaic module.

According to the first aspect, in a possible implementation, the output PV curve further includes a current limiting section connected to the constant power section, the current limiting section means that a difference between output currents corresponding to any two points in the section is less than a second preset threshold, and an output power of the converter decreases linearly as an output voltage decreases. The current limiting section is set, to avoid a case in which the converter outputs a large current because of a too low output voltage, and consequently, the converter or the inverter is damaged.

According to the first aspect, in a possible implementation, the proportional coefficient is determined based on a maximum allowable input voltage of the inverter and an open-circuit voltage of each photovoltaic string, and the open-circuit voltage of each photovoltaic string is a product of a quantity of photovoltaic modules connected in series in the string and an open-circuit voltage of each photovoltaic module.

According to a second aspect, an embodiment of this application discloses a converter. An input end of the converter is connected to at least one photovoltaic module, an output end of the converter is connected to an inverter, and the converter is configured to: convert and output energy generated by the at least one photovoltaic module. The converter includes a DC/DC circuit, a sampling circuit, and a controller. The DC/DC circuit is configured to adjust an output voltage and an output current of the photovoltaic module. The sampling circuit is configured to sample the output voltage and the output current of the photovoltaic module. The controller is configured to determine an output power-voltage (PV) curve of the photovoltaic module based on a collected voltage and current. The controller is further configured to determine an output PV curve of the converter based on the output power-voltage (PV) curve of the photovoltaic module, where the output PV curve includes at least a simulated voltage limiting section and a constant power section that are connected, the simulated voltage limiting section means that an output voltage that is of the converter and that corresponds to any point in the section is proportional to the output voltage of the photovoltaic module and there is a same proportional coefficient, and the constant power section means that any two points in the section correspond to different output voltages and a difference between output powers corresponding to any two points in the section is less than a first preset threshold. The controller is further configured to control a voltage output of the converter based on the output PV curve.

Based on the technical solution in the second aspect, because the output PV curve of the converter includes the simulated voltage limiting section, the output PV curve of the converter is partially similar to the output PV curve of the photovoltaic module. In other words, an output characteristic of the photovoltaic module is simulated, to limit a voltage, so that the photovoltaic module connected to the converter may be equivalent to a photovoltaic module. In other words, from a perspective of a downstream inverter, the photovoltaic module configured with the converter may be considered as a new photovoltaic module. Therefore, an existing MPPT control policy of the inverter can be adapted when a voltage-limited output is implemented, stability of a photovoltaic power generation system can be ensured, and an energy yield of the system can be improved.

According to the second aspect, in a possible implementation, a power corresponding to a first endpoint of the simulated voltage limiting section corresponds to a maximum output power of the photovoltaic module, a voltage corresponding to the first endpoint is determined based on a voltage corresponding to a maximum power point of the photovoltaic module and the proportional coefficient, and the constant power section is connected to the first endpoint. In this way, when an MPPT policy is used for the inverter, the maximum power point can be quickly found, and a case in which a power of a photovoltaic string drops to zero can be avoided.

According to the second aspect, in a possible implementation, a voltage corresponding to a second endpoint of the simulated voltage limiting section is a maximum output voltage of the converter, a power corresponding to the second endpoint is 0, and the maximum output voltage is determined based on an open-circuit voltage of the photovoltaic module and the proportional coefficient, or the maximum output voltage is determined based on a maximum input voltage of the inverter and a quantity of photovoltaic modules connected in series in each photovoltaic string. In this way, the simulated voltage limiting section is similar to a part between the maximum power point in the output PV curve of the photovoltaic module and the open-circuit voltage of the photovoltaic module, so that an output of the photovoltaic module connected to the converter is more similar to an output of the photovoltaic module.

According to the second aspect, in a possible implementation, to diversify the output PV curve of the converter when the MPPT control policy of the inverter is adapted, so as to improve adaptability of the converter, the output PV curve further includes a fixed voltage limiting section connected to the simulated voltage limiting section, the fixed voltage limiting section means that an output voltage corresponding to any point in the section is fixed and unchanged, and the first endpoint is far away from the fixed voltage limiting section.

According to the second aspect, in a possible implementation, a voltage corresponding to the fixed voltage limiting section is the maximum output voltage of the converter, to implement a voltage-limited output, and avoid a case in which a voltage of the photovoltaic string is too high, and consequently, the inverter performs overvoltage protection or even a failure occurs. The maximum output voltage is determined based on the open-circuit voltage of the photovoltaic module and the proportional coefficient, or the maximum input voltage is determined based on the maximum input voltage of the inverter and a quantity of photovoltaic modules connected in series in each photovoltaic string.

According to the second aspect, in a possible implementation, a second endpoint of the simulated voltage limiting section is a first endpoint of the fixed voltage limiting section, the voltage corresponding to the first endpoint of the simulated voltage limiting section is determined based on the voltage corresponding to the maximum power point of the photovoltaic module and an expansion coefficient, and the expansion coefficient is greater than the proportional coefficient. In this way, there may be an intersection point between the simulated voltage limiting section and the fixed voltage limiting section, and when the converter is a buck converter, the output voltage increases in a constant power period. Therefore, conversion efficiency can be improved.

According to the second aspect, in a possible implementation, the voltage corresponding to the first endpoint of the simulated voltage limiting section is less than a voltage corresponding to the fixed voltage limiting section, and a difference between the voltage corresponding to the first endpoint of the simulated voltage limiting section and the voltage corresponding to the fixed voltage limiting section is greater than a preset voltage, to avoid a case in which the simulated voltage limiting section is too short, and consequently, the power of the photovoltaic string drops to zero.

According to the second aspect, in a possible implementation, when the converter is only a boost converter, one endpoint of the constant power section corresponds to the maximum power point of the photovoltaic module.

According to the second aspect, in a possible implementation, the output PV curve of the converter further includes a straight-through section connected to the constant power section, and the straight-through section coincides with a curve between the maximum power point of the output PV curve of the photovoltaic module and a short-circuit current point, so that the photovoltaic module connected to the converter can be completely equivalent to the output of the photovoltaic module.

According to the second aspect, in a possible implementation, the output PV curve further includes a current limiting section connected to the constant power section, the current limiting section means that a difference between output currents corresponding to any two points in the section is less than a second preset threshold, and an output power of the converter decreases linearly as an output voltage decreases.

According to the second aspect, in a possible implementation, the proportional coefficient is determined based on a maximum allowable input voltage of the inverter and an open-circuit voltage of each photovoltaic string, and the open-circuit voltage of each photovoltaic string is a product of a quantity of photovoltaic modules connected in series in the string and an open-circuit voltage of each photovoltaic module.

According to a third aspect, an embodiment of this application discloses a photovoltaic power generation system, including at least one photovoltaic string and an inverter. An input end of the inverter is connected to the at least one photovoltaic string. Each photovoltaic string includes a plurality of photovoltaic units combined together in series. Each photovoltaic unit includes at least one photovoltaic module and the converter according to any one of claims 11 to 20. An input end of the converter is connected to the at least one photovoltaic module, to convert and output energy generated by the at least one photovoltaic module.

According to a fourth aspect, an embodiment of this application discloses a computer-readable storage medium. The computer-readable storage medium stores a computer program, the computer program includes at least one segment of code, and the at least one segment of code may be executed by a computer, to control the computer to perform the method in any one of the first aspect or the possible implementations of the first aspect.

BRIEF DESCRIPTION OF DRAWINGS

FIG. 3 is a flowchart of a converter control method according to an embodiment of this application;

DESCRIPTION OF EMBODIMENTS

This application provides a photovoltaic power generation system, a converter applied to the photovoltaic power generation system, and a converter control method. In the control method, an output characteristic of a photovoltaic module is simulated, so that an output power-voltage (PV) curve of the converter is at least partially similar to an output PV curve of the photovoltaic module. Therefore, an existing MPPT control policy of an inverter can be adapted when a voltage-limited output is implemented, to avoid a case in which a power of a photovoltaic string drops to zero, thereby ensuring stability of the photovoltaic power generation system, and increasing an energy yield of the system.

The following describes embodiments of this application with reference to accompanying drawings.

Figure 1:
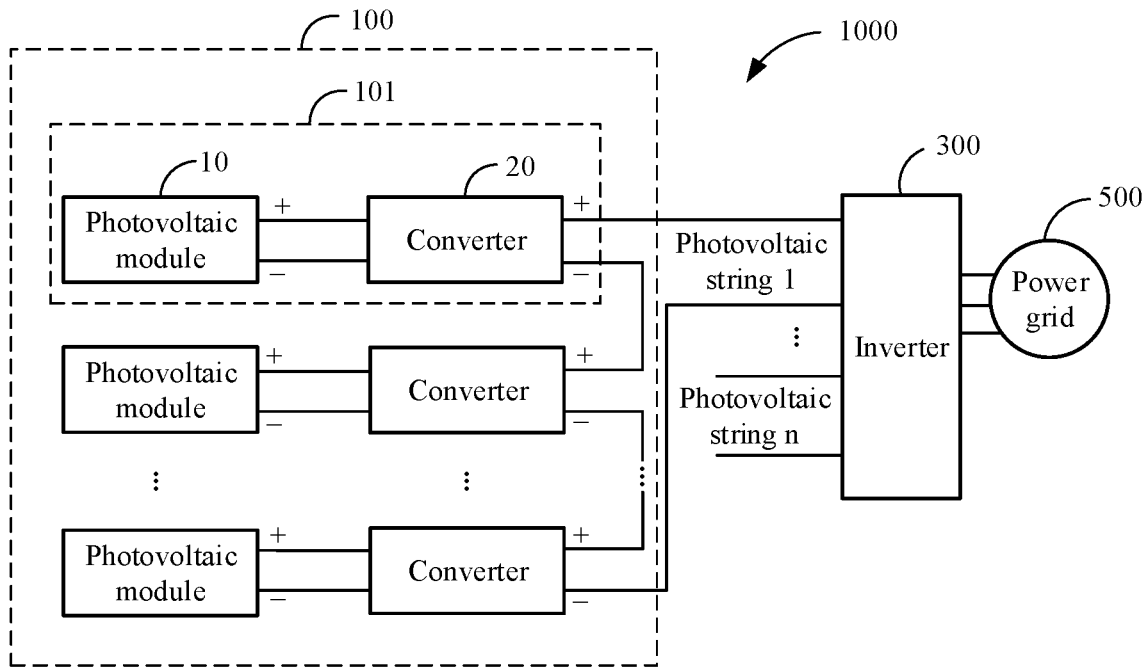
FIG. 1 is a schematic diagram of a structure of a photovoltaic power generation system according to an embodiment of this application.

FIG. 1 is a schematic diagram of a structure of a photovoltaic power generation system 1000 according to an embodiment of this application. As shown in FIG. 1, the photovoltaic power generation system 1000 includes at least one photovoltaic string 100, an inverter 300, and a power grid 500.

In this embodiment of this application, each photovoltaic string 100 includes a plurality of photovoltaic units 101 combined together in series. In another embodiment, the photovoltaic string 100 may include only one photovoltaic unit 101. Each photovoltaic unit 101 includes at least one photovoltaic module 10 and a converter 20. When each photovoltaic unit 101 includes a plurality of photovoltaic modules 10, the plurality of photovoltaic modules 10 are connected in series or/and in parallel and then are connected to the converter 20.

The photovoltaic module 10, also referred to as a solar cell panel, is a core part of the photovoltaic power generation system, converts solar energy into electric energy to provide a direct current for outputting, and transmits the direct current to a storage battery for storage or to drive a load to work.

It should be noted that, because an individual solar cell cannot be directly used as a power supply, several individual cells need to be connected in series or/and in parallel and tightly packaged into a component, and the component is a smallest indivisible photovoltaic cell assembly. In addition, "A and/or B" in this application means A and B, and A or B.

The converter 20, also referred to as an optimizer, is a power conversion apparatus installed between the photovoltaic module 10 and the inverter 300, may be used to eliminate a series mismatch and a parallel mismatch of the photovoltaic module 10 and reduce a probability that the photovoltaic module 10 is bypassed, and has an MPPT (maximum power point tracking) function of a single photovoltaic module 10. In this embodiment of this application, the converter 20 is configured to optimize an output power of the photovoltaic module 10 connected to the converter 20, to ensure a maximum output power of the photovoltaic power generation system 1000.

In another implementation, the converter 20 may be further configured to perform IV curve scanning on the photovoltaic module 10 connected to the converter 20, to detect whether the photovoltaic module 10 connected to the converter 20 is defective or damaged. I refers to current, and V refers to voltage. In addition, an IV curve may further indicate information such as a current power generation capability and working status of the photovoltaic module 10.

An input end of the inverter 300 is connected to the at least one photovoltaic string 100, and is configured to: convert, into an alternating current, a direct current output by the at least one photovoltaic string 100, and then output the alternating current to the power grid 500.

The power grid 500, also referred to as an electrical grid, includes a substation for various voltages and a power transmission and distribution line in a power system, that is, includes a voltage transformation unit, a power transmission unit, and a power distribution unit, and is configured to: transmit and distribute electrical energy, and change a voltage.

It can be understood that the photovoltaic power generation system 1000 may include a plurality of inverters 300, and an alternating current side of the inverter 300 may be connected to a step-up transformer (not shown in the figure) and then connected to the power grid 500. Specifically, a quantity of inverters 300 included in the photovoltaic power generation system 1000 and whether the alternating current side of the inverter 300 is connected to the step-up transformer may be determined based on a specific application environment. This is not specifically limited herein.

It should be noted that in an embodiment, when the photovoltaic power generation system 1000 includes a plurality of inverters 300, the plurality of inverters 300 may communicate with each other through a communications bus. The communications bus may be an industry standard architecture (ISA) bus, a peripheral component interconnect (PCI) bus, an extended industry standard architecture (EISA) bus, or the like. The bus may be classified into an address bus, a data bus, a control bus, and the like, for example, a bus 485.

In addition, in a specific implementation, the photovoltaic power generation system 1000 may further include a host computer (not shown in the figure), configured to communicate with the converter 20 and the inverter 300. The host computer may be an independent communications host, or may be a mobile terminal device. The host computer may communicate with the inverter 300 and the converter 20 through wireless communication (for example, Wi-Fi, Lora, or Zigbee) or PLC communication. In addition, the host computer may alternatively be integrated in another device of the photovoltaic power generation system 1000, for example, integrated in the inverter 300, a combiner box, a parallel box, or one converter 20.

Figure 2:
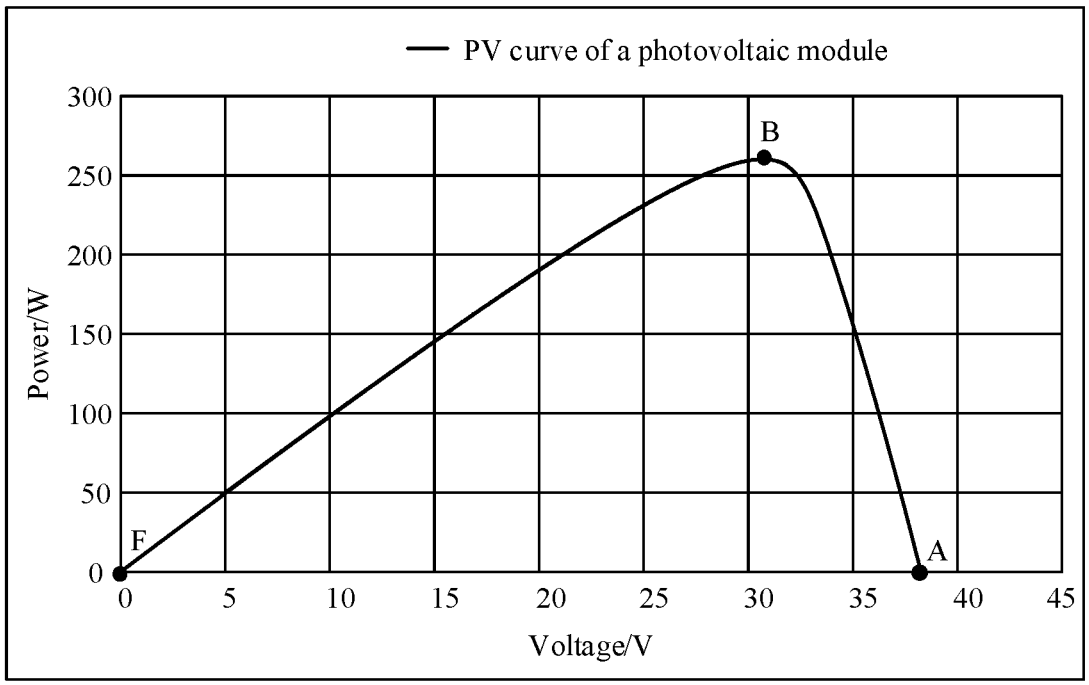
FIG. 2 is a diagram of an output PV curve of a photovoltaic module according to an embodiment of this application.

FIG. 2 is a diagram of an output PV curve of a photovoltaic module according to an embodiment of this application. A characteristic of an output voltage and an output power of the photovoltaic module in light is referred to as a PV curve. It can be seen from FIG. 2 that there is a change trend that the output power of the photovoltaic module increases first and then decreases as the output voltage increases. Therefore, there is an optimal operating point at which a maximum power can be obtained. A voltage corresponding to a point A is an open-circuit voltage Voc of the photovoltaic module, and is defined as a component voltage corresponding to an output without load of the photovoltaic module. A voltage corresponding to a point B is a voltage Vmpp at a maximum power point of the photovoltaic module, and is defined as a component voltage corresponding to a maximum output power of the photovoltaic module.

In addition, an output of the photovoltaic module changes with solar radiation intensity and a temperature of the photovoltaic module. Because the solar radiation intensity and the temperature keep changing, the optimal operating point obviously keeps changing. Relative to these changes, an operating point of the photovoltaic module is always at the maximum power point, and a photovoltaic power generation system always obtains a maximum power output from the photovoltaic module. Such control is maximum power tracking control. A most distinguishing feature of a converter used in the photovoltaic power generation system is that the converter includes a maximum power point tracking (MPPT) function.

Currently, when photovoltaic modules are connected in series, an upper limit of a quantity of photovoltaic modules connected in series in a photovoltaic string needs to be determined based on a local lowest air temperature and a parameter of a selected photovoltaic module, to avoid a case in which in a low temperature scenario, a voltage of the photovoltaic string is too high, and consequently, an inverter performs overvoltage protection or even a failure occurs. After the converter is configured in the photovoltaic power generation system, because the converter may perform a voltage-limited output, there is higher flexibility in configuring the photovoltaic module. The upper limit of the quantity of photovoltaic modules connected in series in the single photovoltaic string may be increased, so that the photovoltaic power generation system can have a higher capacity ratio. Therefore, it is very important to study a proper converter control method to implement the voltage-limited output without affecting an existing control policy of the inverter.

FIG. 3 is a flowchart of a converter control method according to an embodiment of this application. The converter control method specifically includes the following steps.

Step S11: Determine an output PV curve of a converter based on an output power-voltage (PV) curve of the photovoltaic module, where the output PV curve of the converter includes at least a simulated voltage limiting section and a constant power section that are connected.

The simulated voltage limiting section means that an output voltage that is of the converter and that corresponds to any point in the section is proportional to an output voltage of the photovoltaic module and there is a same proportional coefficient. The constant power section means that any two points in the section correspond to different output voltages and a difference between output powers corresponding to any two points in the section is less than a first preset threshold. In other words, within the constant power section, an output voltage of the converter changes, but an output power is approximately constant.

It should be noted that the output PV curve of the photovoltaic module may be obtained by controlling and sampling the output voltage and an output current of the photovoltaic module by using the converter.

Step S12: Control a voltage output of the converter based on the output PV curve of the converter.

According to the converter control method disclosed in this embodiment of this application, because the output PV curve of the converter includes the simulated voltage limiting section, the output PV curve of the converter is partially similar to the output PV curve of the photovoltaic module. In other words, an output characteristic of the photovoltaic module is simulated, to limit a voltage, so that a photovoltaic module connected to the converter may be equivalent to a photovoltaic module. In other words, from a perspective of a downstream inverter, the photovoltaic module configured with the converter may be considered as a new photovoltaic module. Therefore, an existing MPPT control policy of the inverter can be adapted when a voltage-limited output is implemented, stability of a photovoltaic power generation system can be ensured, and an energy yield of the system can be improved.

In some implementations, the proportional coefficient is determined based on a maximum allowable input voltage of the inverter and an open-circuit voltage of each photovoltaic string, and the open-circuit voltage of each photovoltaic string is a product of a quantity of photovoltaic modules connected in series in the string and an open-circuit voltage of each photovoltaic module.

It may be understood that, when photovoltaic modules in each string have different parameters, the open-circuit voltage of each photovoltaic string is a sum of open-circuit voltages of the photovoltaic modules connected in series in the string.

In this embodiment of this application, a single-phase photovoltaic power generation system is used as an example for description, and the maximum allowable input voltage of the inverter is 600 V. Photovoltaic modules have a same parameter, and parameters are as follows. The open-circuit voltage (at a point A) of the photovoltaic module is Voc=38.25 V, a short-circuit current (at a point F) of the photovoltaic module is Isc=9.95 A, and a maximum power point (at a point B) of the photovoltaic module is a point at which Vmpp=30.69 V, Impp=8.48 A, and Pmpp=260.12 W. It may be understood that, in another embodiment, the parameter of the photovoltaic module may alternatively be another parameter. This is not limited herein.

In addition, conversion efficiency of the converter in each embodiment of this application is calculated in terms of 100%. It can be understood that in engineering application, the conversion efficiency of the converter is lower than 100%. With reference to specific embodiments, the following describes how to determine the proportional coefficient and how to determine the simulated voltage limiting section and the constant power section.

Figure 4:
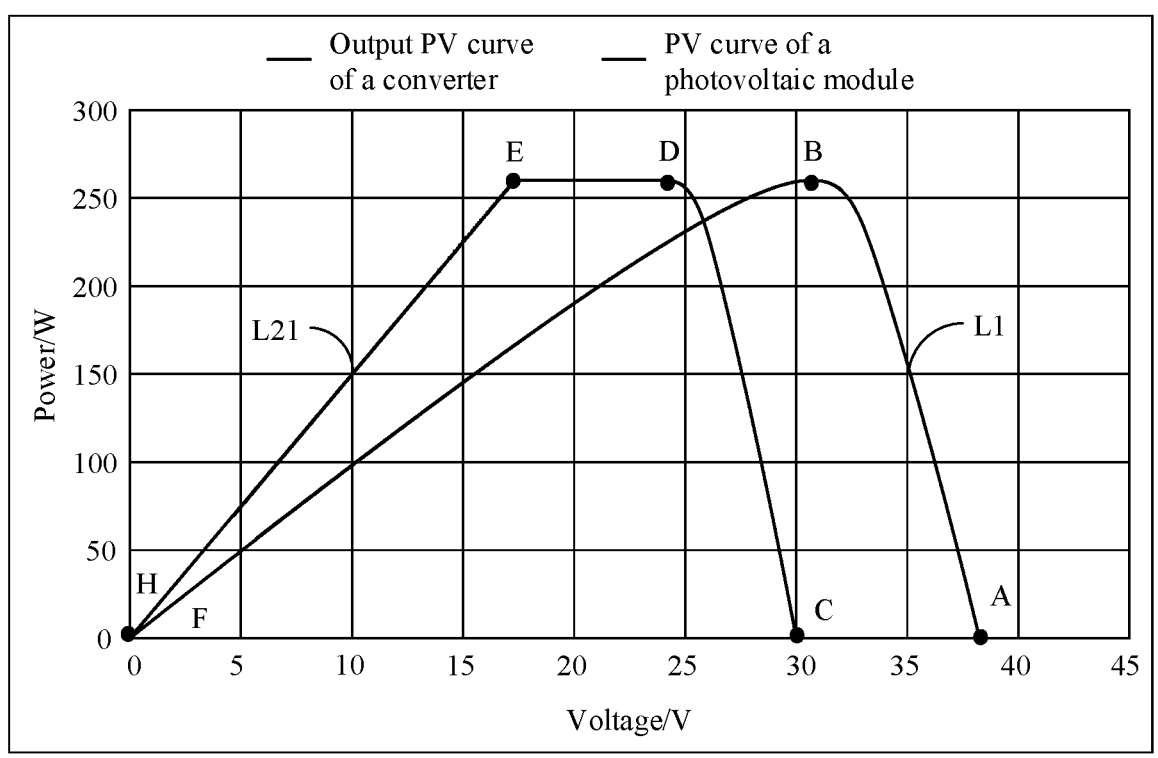
FIG. 4 is a schematic diagram of an output PV curve of a converter according to a first embodiment of this application.

FIG. 4 is a schematic diagram of an output PV curve of a converter according to a first embodiment of this application. A curve L1 is an output PV curve of a photovoltaic module, and a curve L21 is the output PV curve of the converter. Specifically, the output PV curve L21 of the converter includes a simulated voltage limiting section CD and a constant power section DE. In this implementation, there are 20 photovoltaic modules connected in series in a single photovoltaic string. Therefore, a proportional coefficient K=a maximum allowable input voltage of an inverter/a sum of open-circuit voltages of photovoltaic modules=600 V/38.25 V×20=0.7843. In this implementation of this application, the converter is a buck converter.

A voltage at a starting point C of the simulated voltage limiting section CD=38.25 V (a voltage at a point A)×0.7843=30 V. In other words, an upper limit of an output voltage of the converter, namely, the voltage at the point C=600 V/20=30 V. A voltage at an endpoint D of the simulated voltage limiting section CD=30.69 V (a voltage at a point B)×0.7843=24.07 V. In the simulated voltage limiting section CD, the converter simulates an output characteristic of the photovoltaic module, and operates in a buck mode. The output PV curve of the converter and the PV curve of the photovoltaic module have a similar shape, and at any point in the section, the output voltage of the converter is proportional to an input voltage of the converter (namely, an output voltage of the photovoltaic module), and there is a same proportional coefficient K.

Therefore, in this implementation, a power corresponding to the first endpoint D of the simulated voltage limiting section CD is a maximum power of the photovoltaic module, and the voltage corresponding to the first endpoint D of the simulated voltage limiting section is determined based on a voltage corresponding to a maximum power point of the photovoltaic module and the proportional coefficient K. The voltage corresponding to the second endpoint C of the simulated voltage limiting section CD is a maximum output voltage of the converter. The maximum output voltage is determined based on the open-circuit voltage of the photovoltaic module and the proportional coefficient K, or the maximum output voltage is determined based on a maximum input voltage of the inverter and a quantity of photovoltaic strings. When photovoltaic modules in a photovoltaic string have different parameters, a maximum output voltage of each converter is determined based on an open-circuit voltage of each photovoltaic module and the proportional coefficient K.

The constant power section DE is close to the first endpoint D of the simulated voltage limiting section CD, and the constant power section DE and the simulated voltage limiting section CD have the same endpoint D. In the constant power section DE, the converter has a constant power output and operates in the buck mode. The input voltage of the converter is always a voltage at the point B, and the output voltage is allowed to vary between a voltage at the point D and a voltage at a point E. In other words, a voltage corresponding to the second endpoint E of the constant power section DE is less than the voltage corresponding to the first endpoint D of the constant power section DE.

It can be understood that in engineering application, the output voltage of the converter at the point D is higher than the voltage at the point E, and conversion efficiency of the converter at the point D is slightly higher than conversion efficiency at the point E. Therefore, the power at the point D is slightly higher than a power at the point E. However, because the power at the point D is approximately equal to the power at the point E, the section DE may be considered as a constant power section. Therefore, the constant power section DE means that any two points in the section correspond to different output voltages, and a difference between output powers corresponding to any two points in the section is less than a first preset threshold. The first preset threshold may be set based on an actual application situation and a hardware parameter of the converter, provided that a power in the constant power section DE fluctuates within a preset range.

In a specific implementation, the output curve L21 of the converter further includes a current limiting section EH connected to the constant power section DE. The current limiting section EH means that a difference between output currents corresponding to any two points in the section is less than a second preset threshold. In other words, in the current limiting section EH, the converter performs a current-limited output, and at any point in the section, an output current of the converter is approximately constant, and an output power of the converter decreases linearly as the output voltage decreases. It can be understood that the second preset threshold may be set based on the actual application situation and the hardware parameter of the converter, provided that a current in the current limiting section EH fluctuates within a preset range. Therefore, damage that is caused by a large output current of the converter to the converter and the inverter can be avoided.

The second endpoint of the constant power section DE and a first endpoint of the current limiting section EH are the same, and both are the point E. The power corresponding to the point E corresponds to the maximum power of the photovoltaic module, and the voltage corresponding to the point E is a maximum voltage in the current limiting section of the converter. A second endpoint H of the current limiting section corresponds to a short-circuit current point F in the PV curve of the photovoltaic module, but the second endpoint H of the current limiting section represents an output short-circuit point of the converter. An input voltage of the converter at the point H is the voltage corresponding to the point A. In other words, in this case, the photovoltaic module operates at the point A. It can be understood that the voltage corresponding to the point E is determined based on a hardware characteristic of the converter. Therefore, the voltage at the point E may be preset based on the characteristic of the converter.

Figure 5:
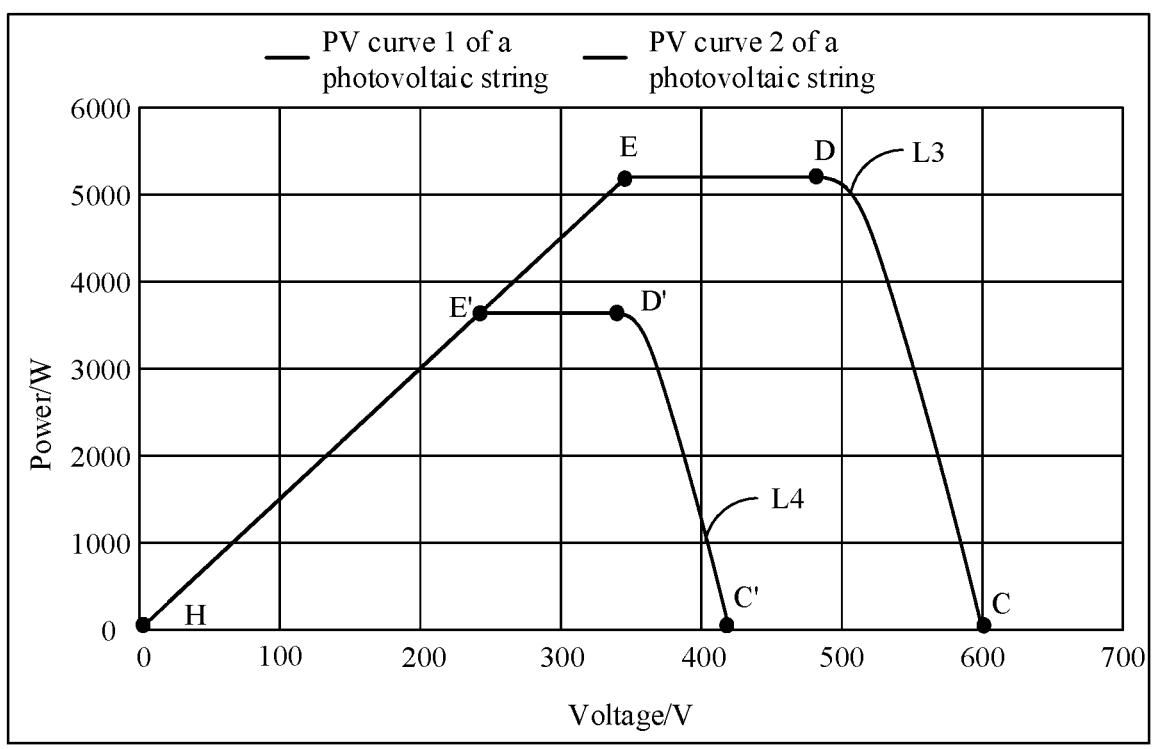
FIG. 5 is a schematic diagram of an output PV curve of a photovoltaic string according to a first embodiment of this application.

The curve L21 shown in FIG. 4 is an output PV curve of a converter of a photovoltaic module. However, because a photovoltaic string includes 20 photovoltaic modules, an output PV curve of the photovoltaic string is a superposition of output PV curves of 20 converters. Specifically, as shown in FIG. 5, a curve L3 in FIG. 5 is an output PV curve of a photovoltaic string including 20 photovoltaic modules. It can be seen from FIG. 5 that the output PV curve L3 of the photovoltaic string is similar to the output PV curve of the photovoltaic module, and a voltage and a power that correspond to each point are only increased by 20 times. Therefore, for the inverter, because the simulated voltage limiting section CD is a section in which the output characteristic of the photovoltaic module is simulated, even if the converter is configured, the entire photovoltaic string may still be considered as a new photovoltaic module. Therefore, existing MPPT of the inverter may operate normally and does not need to be changed. In a steady state, due to the MPPT of the inverter, an input voltage of the inverter is stable at the point D (481.4 V=24.07 V×20) and fluctuates around the point D.

When six photovoltaic modules in the photovoltaic string are seriously blocked (a power is zero), the output PV curve of the photovoltaic string changes to a curve L4. In the steady state, due to the MPPT of the inverter, the input voltage of the inverter is stable at a point D' (336.98 V=24.07 V×14) and fluctuates around the point D'. Therefore, there is no risk that the power of the photovoltaic string drops to zero.

Figure 6:
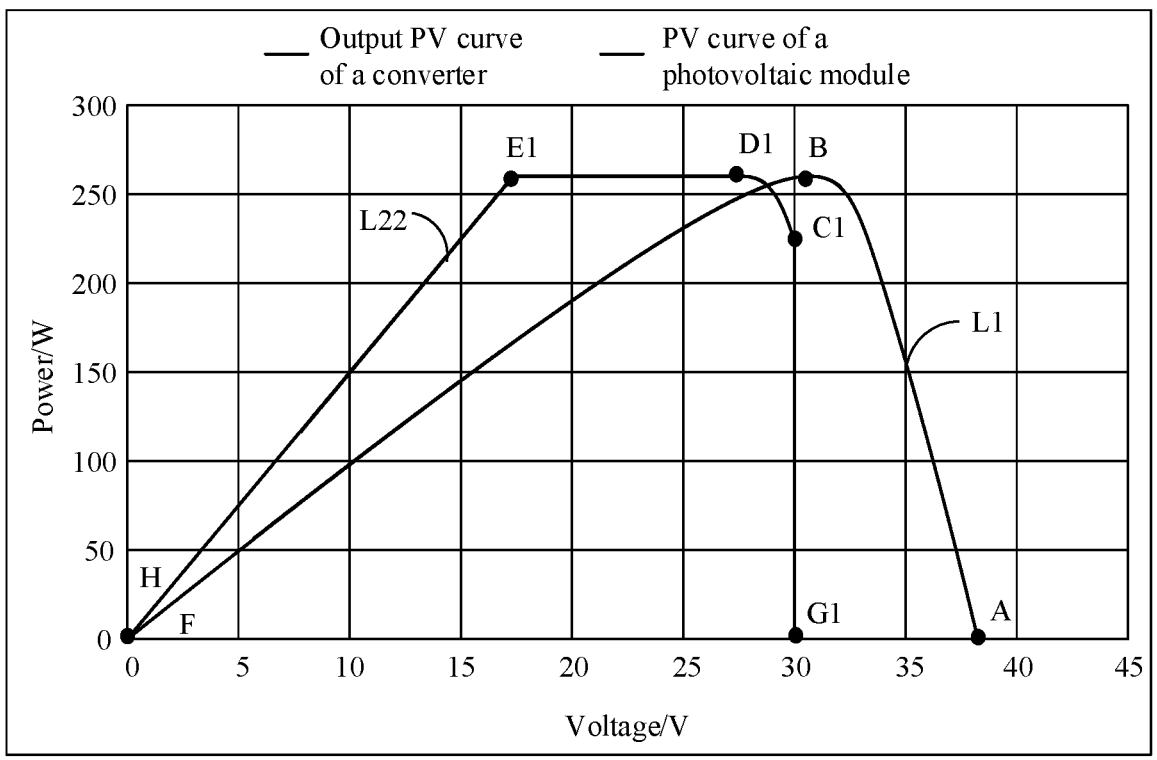
FIG. 6 is a schematic diagram of an output PV curve of a converter according to a second embodiment of this application.

FIG. 6 is a schematic diagram of an output PV curve of a converter according to a second embodiment of this application. Different from the first embodiment, in this embodiment of this application, an output PV curve L22 of the converter further includes a fixed voltage limiting section G1C1 connected to a simulated voltage limiting section C1D1. The fixed voltage limiting section G1C1 means that an output voltage corresponding to any point in the section is fixed and unchanged. In this implementation, a voltage corresponding to the fixed voltage limiting section G1C1 is a maximum output voltage of the converter. The maximum output voltage of the converter at a point G1=a voltage at a point C1=600 V/20=30 V.

In addition, the fixed voltage limiting section G1C1 and the simulated voltage limiting section C1D1 have a same endpoint C1, and a power corresponding to the other endpoint D1 of the simulated voltage limiting section C1D1 corresponds to a maximum power of a photovoltaic module. In this implementation, because the fixed voltage limiting section G1C1 is set, and a higher voltage at the point D1 is allowed to be set, conversion efficiency of the converter is high, and the conversion efficiency of the converter is higher than that in the first embodiment.

To enable the simulated voltage limiting section C1D1 to move to the right, so that there is an intersection point C1 between the simulated voltage limiting section C1D1 and the fixed voltage limiting section G1C1, a proportional coefficient K needs to be increased. In this embodiment of this application, the increased proportional coefficient is referred to as an expansion coefficient. It can be understood that a larger increase from the proportional coefficient to the expansion coefficient indicates a larger amplitude of movement of the simulated voltage limiting section C1D1 to the right. When the expansion coefficient is too large, the simulated voltage limiting section C1D1 is very close to the fixed voltage limiting section G1C1, so that the simulated voltage limiting section C1D1 is too small, thereby affecting MPPT of the inverter. Therefore, in some implementations, a voltage corresponding to the endpoint D1 of the simulated voltage limiting section G1C1 needs to be less than the voltage corresponding to the fixed voltage limiting section G1C1, and a difference between the voltage corresponding to the endpoint D1 of the simulated voltage limiting section G1C1 and the voltage corresponding to the fixed voltage limiting section G1C1 is greater than a preset voltage. For example, the preset voltage may be 2 V.

Specifically, the expansion coefficient may be 0.9. Therefore, an upper limit of an output voltage of the converter at the point G1=a voltage at the point C1=600 V/20=30 V, and an output voltage of the converter at the point D1=30.69 V×0.9=27.62 V. In this embodiment of this application, the converter operates in a buck mode in the entire PV curve L22.

Figure 7:
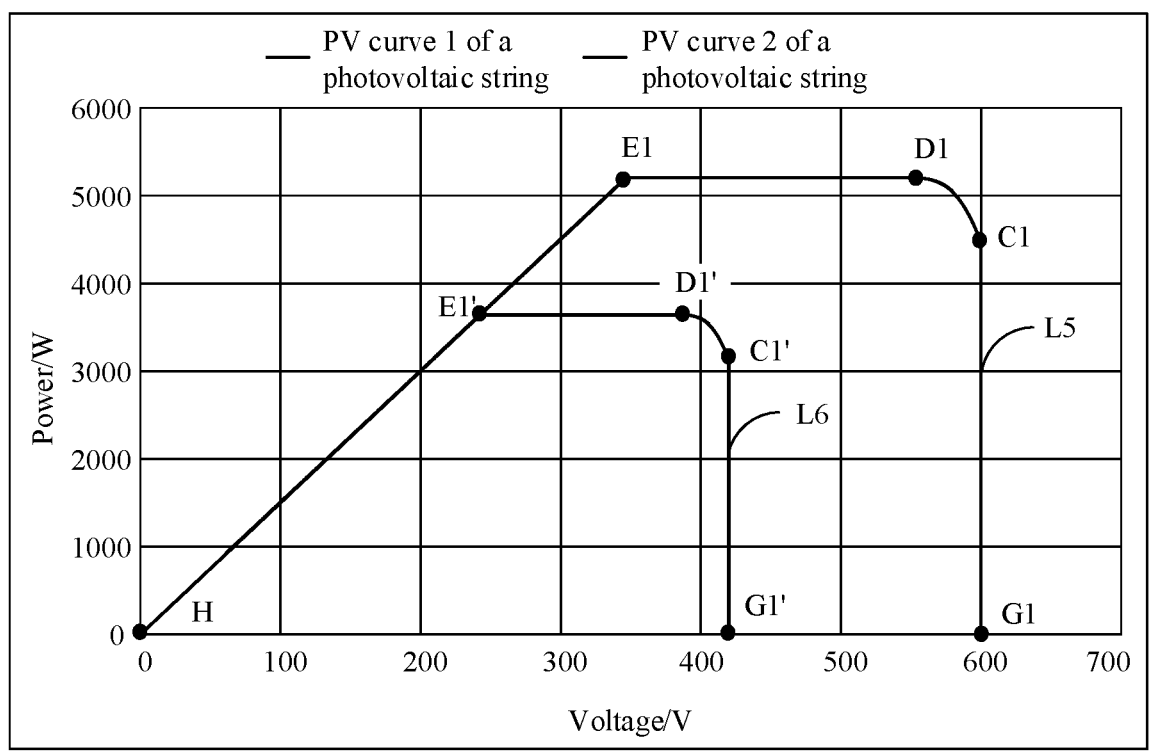
FIG. 7 is a schematic diagram of an output PV curve of a photovoltaic string according to a second embodiment of this application.

The output PV curve L22 shown in FIG. 6 is an output PV curve of a converter of a photovoltaic module. However, because a photovoltaic string includes 20 photovoltaic modules, an output PV curve of the photovoltaic string is a superposition of output PV curves of 20 converters. Specifically, as shown in FIG. 7, an output PV curve L5 in FIG. 7 is an output PV curve of a photovoltaic string including 20 photovoltaic modules, and the PV curve L5 of the photovoltaic string is a superposition of output PV curves of 20 converters. The simulated voltage limiting section C1D1 is a section in which a characteristic of the photovoltaic module is simulated. From a perspective of a downstream inverter, a photovoltaic module configured with a converter may be considered as a new photovoltaic module. Therefore, existing MPPT of the inverter may operate normally and does not need to be changed. In a steady state, due to the MPPT of the inverter, an input voltage of the inverter is stable at the point D1 (552.4 V=27.62 V×20) and fluctuates around the point D1.

When six photovoltaic modules in the photovoltaic string are seriously blocked (a power is zero), the PV curve L5 of the photovoltaic string changes to a PV curve L6 of the photovoltaic string. In the steady state, due to the MPPT of the inverter, the input voltage of the inverter is stable at a point Dr (386.68 V=27.62 V×14) and fluctuates around the point Dr. Therefore, there is no risk that the power of the photovoltaic string drops to zero.

Figure 8:
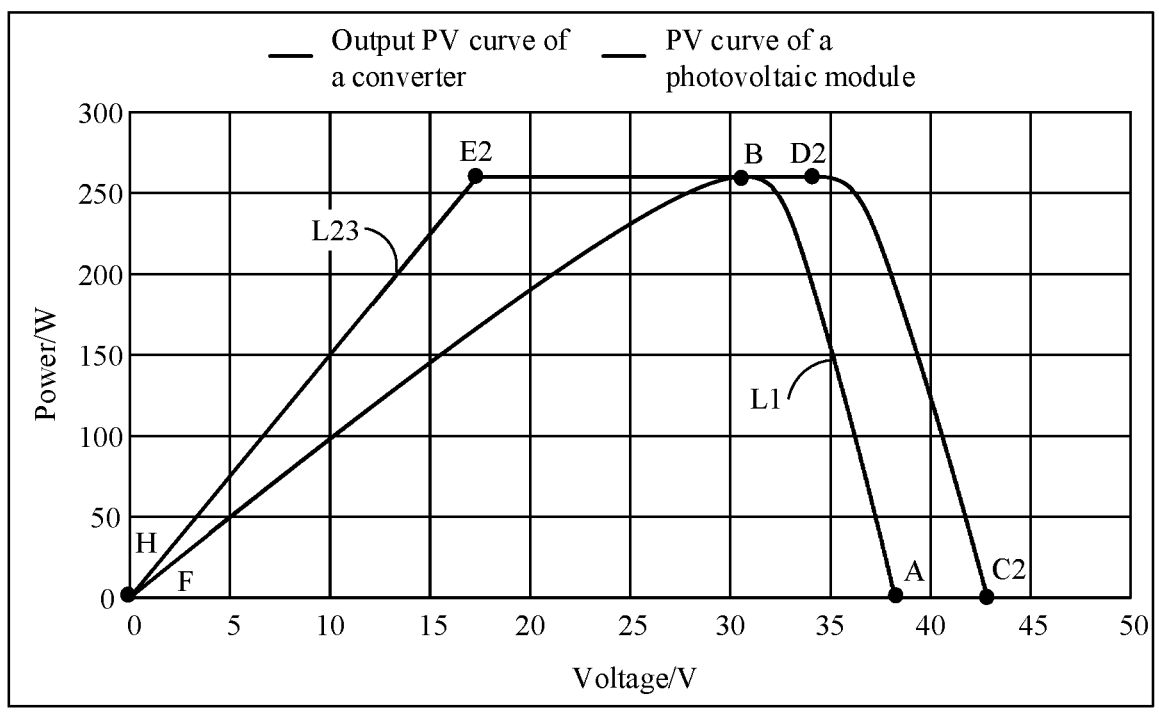
FIG. 8 is a schematic diagram of an output PV curve of a converter according to a third embodiment of this application.

FIG. 8 is a schematic diagram of an output PV curve of a converter according to a third embodiment of this application. In this embodiment of this application, there are 14 photovoltaic modules connected in series in a single photovoltaic string. Therefore, the proportional coefficient K=a maximum allowable input voltage of an inverter/a sum of open-circuit voltages of photovoltaic modules=600 V/38.25 V×14=1.1204, and a maximum output voltage of the converter at a point C2=600 V/14=42.86 V. A voltage at an endpoint D2 of a simulated voltage limiting section C2D2=30.69 V×1.1204=34.39 V.

It should be noted that, different from the first embodiment, the converter operates in a boost mode in the simulated voltage limiting section C2D2. The converter operates in the boost mode in a constant power section D2B, an input voltage of the converter is always a voltage at a point B, and an output voltage is allowed to vary between the voltage at the point D2 and the voltage at the point B. The converter operates in a buck mode in a constant power section BE2, the input voltage of the converter is always the voltage at the point B, and the output voltage is allowed to vary between the voltage at the point B and the voltage at a point E2.

Figure 9:
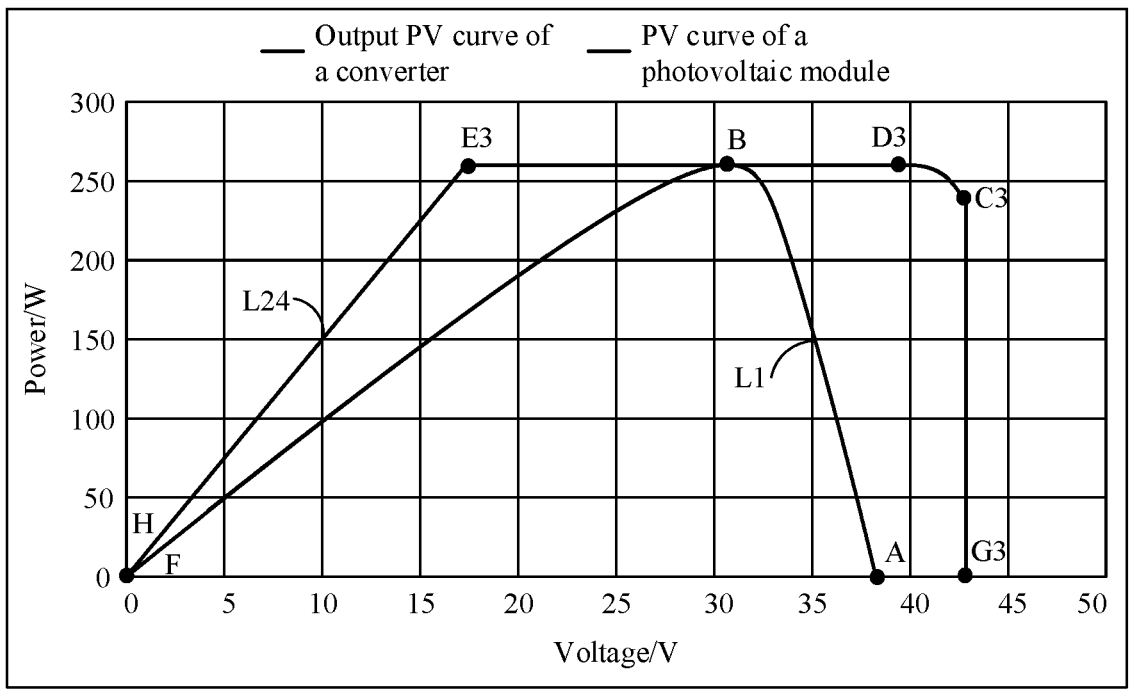
FIG. 9 is a schematic diagram of an output PV curve of a converter according to a fourth embodiment of this application.

FIG. 9 is a schematic diagram of an output PV curve of a converter according to a fourth embodiment of this application. Different from the third embodiment, the output PV curve further includes a fixed voltage limiting section G3C3. In this implementation, an upper limit of an output voltage of the converter at a point G3=a voltage at a point C3=600 V/14=42.86 V, and an expansion coefficient is 1.3. Therefore, a voltage corresponding to an endpoint D3 of a simulated voltage limiting section C3D3=30.69 V×1.3=39.90 V.

Figure 10:
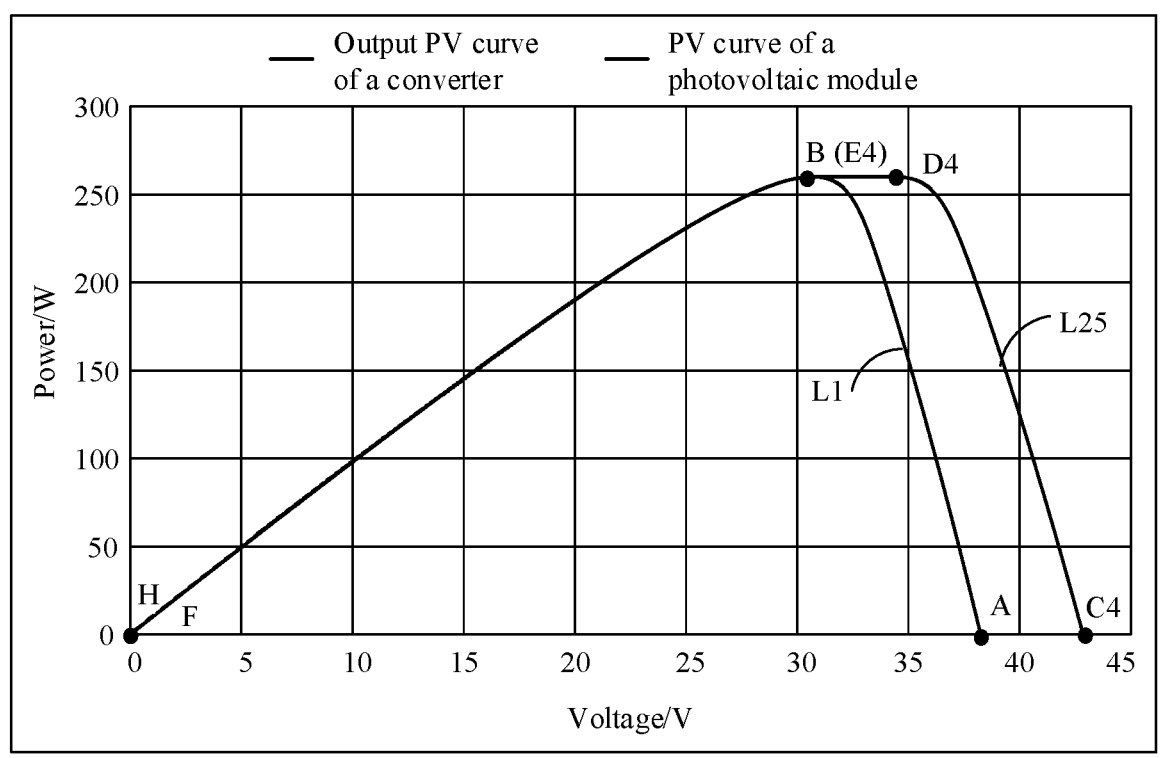
FIG. 10 is a schematic diagram of an output PV curve of a converter according to a fifth embodiment of this application.

FIG. 10 is a schematic diagram of an output PV curve of a converter according to a fifth embodiment of this application. Different from the third embodiment, an endpoint E4 of a constant power section D4E4 is a maximum power point B of a photovoltaic module, and the output PV curve of the converter further includes a straight-through section E4H connected to the constant power section. The straight-through section E4H coincides with a curve between the maximum power point B of an output PV curve of the photovoltaic module and a short-circuit current point F. In other words, an output voltage of the converter in the straight-through section E4H is equal to an input voltage, and a photovoltaic module connected to the converter is equivalent to the photovoltaic module.

In this implementation, the converter is a boost converter. Specifically, the converter operates in a boost mode in a simulated voltage limiting section C4D4. The converter operates in the boost mode in the constant power section D4E4, the input voltage of the converter is always a voltage at the point B, and the output voltage is allowed to vary between a voltage at a point D4 and a voltage at a point E4.

Figure 11:
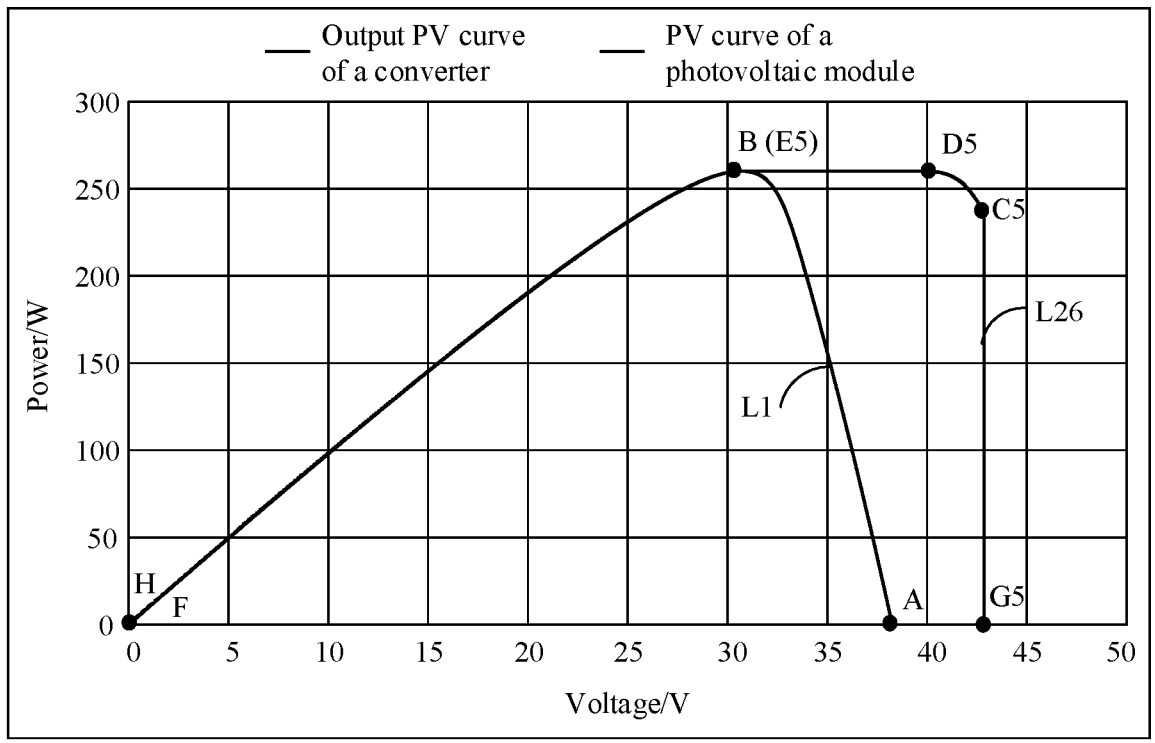
FIG. 11 is a schematic diagram of an output PV curve of a converter according to a sixth embodiment of this application.

FIG. 11 is a schematic diagram of an output PV curve of a converter according to a sixth embodiment of this application. Different from the fifth embodiment, the output PV curve further includes a fixed voltage limiting section G5C5. In this implementation, an upper limit of an output voltage of the converter at a point G5=a voltage at a point C5=600 V/14=42.86 V, and an expansion coefficient is 1.3. Therefore, a voltage corresponding to an endpoint D5 of a simulated voltage limiting section C5D5=30.69 V×1.3=39.90 V.

In this implementation, the converter is a boost converter. Specifically, the converter operates in a boost mode in the simulated voltage limiting section C5D5, the converter operates in the boost mode in a constant power section D5E5, an input voltage of the converter is always a voltage at a point B, and an output voltage is allowed to vary between the voltage at the point D5 and a voltage at a point E5.

Figure 12:
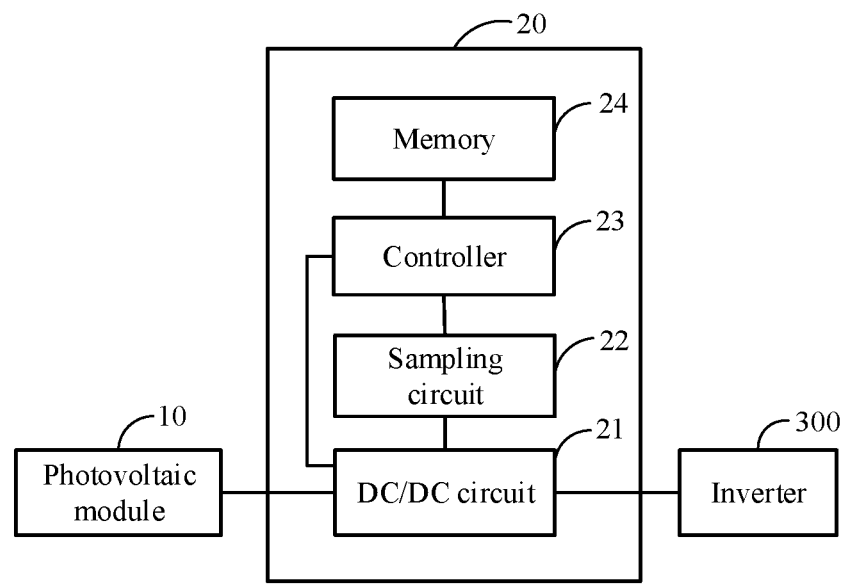
FIG. 12 is a principle block diagram of an optimizer according to an embodiment of this application.

FIG. 12 is a functional block diagram of a converter according to an embodiment of this application. In other words, the converter 20 in FIG. 1 may be implemented by using a structure in FIG. 12. As shown in FIG. 12, the converter 20 includes a DC/DC circuit 21, a sampling circuit 22, a controller 23, and a memory 24. Functions of the DC/DC circuit 21, the sampling circuit 22, the controller 23, and the memory 24 may be implemented by using an integrated circuit, and the direct current-to-direct current (DC/DC) circuit 21, the sampling circuit 22, the controller 23, and the memory 24 are integrated into a PCB (printed circuit board). The printed circuit board, also referred to as a printed line board, is an important electronic part, is a support body of an electronic component, and is a carrier that is electrically connected to the electronic component.

In this embodiment of this application, the DC/DC circuit 21 is correspondingly connected to at least one photovoltaic module, and is used as an input end of the converter 20, to adjust an output voltage of a photovoltaic module 10. In another embodiment, the converter 20 may include a plurality of DC/DC circuits 21, and each DC/DC circuit 21 is connected to at least one photovoltaic module 10.

In a specific embodiment, the DC/DC circuit 21 may work in a power conversion mode, to perform power conversion on direct current electric energy of the photovoltaic module 10 at the input end, and then output converted direct current electric energy to an output end, or may work in a straight-through mode, to directly connect the input end and an output end. In a specific actual application, circuit setting may be performed on the DC/DC circuit 21 based on a specific application environment, for example, a buck circuit, a boost circuit, a buck-boost circuit, or the like may be set.

The sampling circuit 22 is electrically connected to the DC/DC circuit 21, to detect an output voltage of the photovoltaic module 10 and a current corresponding to the output voltage. In a specific actual application, the sampling circuit 22 may include a sensor, for example, a current sensor.

The controller 23 is separately electrically connected to the DC/DC circuit 21, the sampling circuit 22, and the memory 24. The controller 23 is a part that can coordinate work of all parts based on a function requirement of an instruction, is a nerve center and a command center of a system, usually includes three parts: an instruction register (IR), a program counter (PC), and an operation controller (OC), and plays an important role in coordinating ordered work of the entire system. The controller 23 herein may be one or more devices, circuits, and/or processing cores configured to process data (for example, computer program instructions).

In another embodiment, the controller 23 may be a processor, or may be a general term of a plurality of processing elements. For example, the processor may be a general-purpose central processing unit (CPU), or may be an application-specific integrated circuit (ASIC), or one or more integrated circuits configured to control execution for a program, for example, one or more micro-processors (DSP) or one or more field programmable gate arrays (FPGA). During specific implementation, in an embodiment, the processor may include one or more CPUs.

In this implementation, the controller 23 is configured to perform the foregoing control method, to control an output of a converter 100.

The memory 24 may be a read-only memory (ROM) or another type of static storage device that can store static information and static instructions, or may be a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. This is not limited thereto. The memory 24 may exist independently. Alternatively, the memory 24 may be integrated with the controller 23. The memory 24 may be configured to store data such as a current, a voltage, and a power of the photovoltaic module 10.

In this embodiment of this application, the memory 24 is further configured to store application code for executing the solutions of this application, and the controller 23 controls execution. To be specific, the controller 23 is configured to execute the application code stored in the memory 24.

It may be understood that a structure shown in this embodiment of this application does not constitute a specific limitation on the converter 20. In some other embodiments of this application, the converter 20 may include more or fewer components than those shown in the figure, or combine some components, or split some components, or have different component arrangements. The components shown in the figure may be implemented by using hardware, software, or a combination of software and hardware.

It may be clearly understood by a person skilled in the art that, for the purpose of convenient and brief description, for a detailed working process of the foregoing apparatus and unit, refer to a corresponding process in the foregoing method embodiments, and details are not described herein again.

The embodiments in this specification are all described in a progressive manner, for same or similar parts in the embodiments, refer to these embodiments, and each embodiment focuses on a difference from other embodiments. The method disclosed in the embodiments corresponds to the apparatus disclosed in the embodiments, and therefore is briefly described. For related parts, refer to the description of the apparatus.

It should be noted that, for brief description, the foregoing method embodiments are represented as a series of actions. However, a person skilled in the art should appreciate that this application is not limited to the described order of the actions, because according to this application, some steps may be performed in other orders or simultaneously.

A sequence of the steps of the method in the embodiments of this application may be adjusted, combined, or removed based on an actual requirement.

The implementations of this application may be randomly combined to achieve different technical effects.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk), or the like.

In summary, the foregoing description of embodiments of the technical solutions described herein are not intended to limit the scope of protection the claims. Any modification, equivalent replacement, or improvement made according to the disclosure shall fall within the scope of protection of the claims.

What is claimed is:

1. A converter control method, used to control an output of a converter, wherein an input end of the converter is connected to at least one photovoltaic module, an output end of the converter is connected to an inverter, the converter is configured to: convert and output energy generated by the at least one photovoltaic module, and the control method comprises:
   determining an output power-voltage (PV) curve of the converter based on an output PV curve of the photovoltaic module, wherein the output PV curve of the converter comprises at least a simulated voltage limiting section and a constant power section that are connected, wherein an output voltage for any point corresponding to the simulated voltage limiting section is proportional to an output voltage of the photovoltaic module is in accordance with a proportional coefficient that is constant within the simulated voltage limiting section, and wherein a difference between an output powers for any two points corresponding to the constant power section is less than a first preset threshold; and
   controlling a voltage output of the converter based on the output PV curve of the converter.

2. The control method according to claim 1, wherein a power corresponding to a first endpoint of the simulated voltage limiting section corresponds to a maximum output power of the photovoltaic module, a voltage corresponding to the first endpoint is determined based on a voltage corresponding to a maximum power point of the photovoltaic module and the proportional coefficient, and the constant power section is connected to the first endpoint.

3. The control method according to claim 2, wherein a voltage corresponding to a second endpoint of the simulated voltage limiting section is a maximum output voltage of the converter, a power corresponding to the second endpoint is 0, and the maximum output voltage is determined: based on an open-circuit voltage of the photovoltaic module and the proportional coefficient, or based on a maximum input voltage of the inverter and a quantity of photovoltaic modules connected in series in each photovoltaic string.

4. The control method according to claim 2, wherein the output PV curve further comprises a fixed voltage limiting section connected to the simulated voltage limiting section, wherein an output voltage for any point corresponding to the fixed voltage limiting section is a fixed voltage and constant for all points in the fixed voltage limiting section, and the first endpoint is not connected to the fixed voltage limiting section.

5. The control method according to claim 4, wherein a second endpoint of the simulated voltage limiting section is a first endpoint of the fixed voltage limiting section, the output voltage corresponding to the first endpoint of the simulated voltage limiting section is determined based on the voltage corresponding to the maximum power point of the photovoltaic module and an expansion coefficient, and the expansion coefficient is greater than the proportional coefficient.

6. The control method according to claim 5, wherein the output voltage corresponding to the first endpoint of the simulated voltage limiting section is less than the fixed voltage corresponding to the fixed voltage limiting section, and a difference between the output voltage corresponding to the first endpoint of the simulated voltage limiting section and the fixed voltage corresponding to the fixed voltage limiting section is greater than a preset voltage.

7. The control method according to claim 2, wherein the converter is a boost converter, and one endpoint of the constant power section corresponds to the maximum power point of the photovoltaic module.

8. The control method according to claim 7, wherein the output PV curve of the converter further comprises a straight-through section connected to the constant power section, and the straight-through section coincides with a curve between the maximum power point of the output PV curve of the photovoltaic module and a short-circuit current point.

9. The control method according to claim 1, wherein the output PV curve of the converter further comprises a current limiting section connected to the constant power section, wherein a difference between output currents for any two points in the current limiting section is less than a second preset threshold, and an output power of the converter decreases linearly as an output voltage decreases.

10. The control method according to claim 1, wherein the proportional coefficient is determined based on a maximum allowable input voltage of the inverter and an open-circuit voltage of each photovoltaic string, and the open-circuit voltage of each photovoltaic string is a product of a quantity of photovoltaic modules connected in series in the string and an open-circuit voltage of each photovoltaic module.

11. A converter, wherein an input end of the converter is connected to at least one photovoltaic module, an output end of the converter is connected to an inverter, the converter is configured to: convert and output energy generated by the at least one photovoltaic module, and the converter comprises:
   a DC/DC circuit, configured to adjust an output voltage and an output current of the photovoltaic module;
   a sampling circuit, configured to sample the output voltage and the output current of the photovoltaic module; and
   a controller, configured to determine an output power-voltage (PV) curve of the photovoltaic module based on a collected voltage and current, wherein the controller is further configured to determine an output PV curve of the converter based on the output PV curve of the photovoltaic module, wherein the output PV curve of the converter comprises at least a simulated voltage limiting section and a constant power section that are connected, wherein an output voltage for any point corresponding to the simulated voltage limiting section is proportional to the output voltage of the photovoltaic module and is in accordance with a proportional coefficient that is constant within the simulated voltage limiting section, and wherein a difference between an output powers for any two points corresponding to the constant power section is less than a first preset threshold; and the controller is further configured to control a voltage output of the converter based on the output PV curve of the converter.

12. The converter according to claim 11, wherein a power corresponding to a first endpoint of the simulated voltage limiting section corresponds to a maximum output power of the photovoltaic module, a voltage corresponding to the first endpoint is determined based on a voltage corresponding to a maximum power point of the photovoltaic module and the proportional coefficient, and the constant power section is connected to the first endpoint.

13. The converter according to claim 12, wherein a voltage corresponding to a second endpoint of the simulated voltage limiting section is a maximum output voltage of the converter, a power corresponding to the second endpoint is 0, and the maximum output voltage is determined: based on an open-circuit voltage of the photovoltaic module and the proportional coefficient, or based on a maximum input voltage of the inverter and a quantity of photovoltaic modules connected in series in each photovoltaic string.

14. The converter according to claim 12, wherein the output PV curve further comprises a fixed voltage limiting section connected to the simulated voltage limiting section, wherein an output voltage for any point corresponding to the fixed voltage limiting section is a fixed and constant for all points in the fixed voltage limiting section, and the first endpoint is not connected to the fixed voltage limiting section.

15. The converter according to claim 14, wherein a second endpoint of the simulated voltage limiting section is a first endpoint of the fixed voltage limiting section, the output voltage corresponding to the first endpoint of the simulated voltage limiting section is determined based on the voltage corresponding to the maximum power point of the photovoltaic module and an expansion coefficient, and the expansion coefficient is greater than the proportional coefficient.

16. The converter according to claim 15, wherein the output voltage corresponding to the first endpoint of the simulated voltage limiting section is less than the fixed voltage corresponding to the fixed voltage limiting section, and a difference between the output voltage corresponding to the first endpoint of the simulated voltage limiting section and the fixed voltage corresponding to the fixed voltage limiting section is greater than a preset voltage.

17. The converter according to claim 12, wherein the converter is a boost converter, and one endpoint of the constant power section corresponds to the maximum power point of the photovoltaic module.

18. The converter according to claim 17, wherein the output PV curve of the converter further comprises a straight-through section connected to the constant power section, and the straight-through section coincides with a curve between the maximum power point of the output PV curve of the photovoltaic module and a short-circuit current point.

19. The converter according to claim 11, wherein the output PV curve of the converter further comprises a current limiting section connected to the constant power section, wherein a difference between output currents for any two points in the current limiting section is less than a second preset threshold, and an output power of the converter decreases linearly as an output voltage decreases.

20. The converter according to claim 11, wherein the proportional coefficient is determined based on a maximum allowable input voltage of the inverter and an open-circuit voltage of each photovoltaic string, and the open-circuit voltage of each photovoltaic string is a product of a quantity of photovoltaic modules connected in series in the string and an open-circuit voltage of each photovoltaic module.

21. A photovoltaic power generation system, the system comprising:

at least one photovoltaic string and an inverter, wherein an input end of the inverter is connected to the at least one photovoltaic string, each photovoltaic string comprises a plurality of photovoltaic units combined together in series, each photovoltaic unit comprises at least one photovoltaic module and the converter according to claim 11, and an input end of the converter is connected to the at least one photovoltaic module, to convert energy generated by the at least one photovoltaic module and output converted energy to the inverter.

* * * * *